(12) United States Patent
Polidori

(10) Patent No.: US 7,304,243 B2
(45) Date of Patent: Dec. 4, 2007

(54) CABLE CONNECTOR

(75) Inventor: Mario Polidori, Medford Lakes, NJ (US)

(73) Assignee: Connector Products, Inc., Cinnaminson, NJ (US)

( * ) Notice: Subject to any disclaimer, the term of this patent is extended or adjusted under 35 U.S.C. 154(b) by 18 days.

(21) Appl. No.: 11/187,189

(22) Filed: Jul. 22, 2005

(65) Prior Publication Data

US 2007/0017689 A1    Jan. 25, 2007

(51) Int. Cl.
    *H01R 4/18*    (2006.01)
(52) U.S. Cl. .................................... 174/84 C
(58) Field of Classification Search ............. 174/84 C, 174/88 R, 78, 40 R, 94 S, 117 F, 128.1; 403/369; 439/783; 119/903; 52/101
    See application file for complete search history.

(56) References Cited

U.S. PATENT DOCUMENTS

| | | | | |
|---|---|---|---|---|
| 1,854,783 | A * | 4/1932 | Cook | 439/788 |
| 2,025,556 | A * | 12/1935 | Stahl | 403/369 |
| 2,356,014 | A * | 8/1944 | Wade et al. | 403/316 |
| 2,572,940 | A * | 10/1951 | Lockhart | 116/203 |
| 2,966,653 | A * | 12/1960 | Jugle | 403/314 |
| 3,378,892 | A * | 4/1968 | Vano | 403/369 |
| 3,616,517 | A * | 11/1971 | Stanwood et al. | 29/414 |
| 4,183,686 | A | 1/1980 | De France | |
| 5,095,178 | A * | 3/1992 | Hollingsworth | 174/94 R |
| 5,116,337 | A * | 5/1992 | Johnson | 606/73 |
| 5,278,353 | A * | 1/1994 | Buchholz et al. | 174/84 R |
| 6,023,549 | A | 2/2000 | Polidori | |
| 6,273,765 | B1 * | 8/2001 | Lalaouna et al. | 439/784 |
| 2002/0119710 | A1 * | 8/2002 | Mello et al. | 439/783 |
| 2003/0160137 | A1 * | 8/2003 | Shuey | 248/72 |
| 2004/0245776 | A1 * | 12/2004 | Evans et al. | 285/259 |

FOREIGN PATENT DOCUMENTS

WO    WO 02/073765    9/2002

* cited by examiner

*Primary Examiner*—Chau N. Nguyen
(74) *Attorney, Agent, or Firm*—Norman E. Leher

(57) ABSTRACT

A cable clamp includes a housing having a cavity therein with two opposed walls and an open end in communication with the cavity. A pair of wedge shaped jaws are located within the housing and are slideably movable toward and away from the opening. Each of the jaws includes a semi-cylindrical gripping surface which are adapted to move toward each other to grip a cable therebetween when the jaws move toward the opening and are able to move away from each other when the jaws move away from the opening so as to release a cable located therebetween. A spring biases the jaws toward the opening so that they are biased into the gripping position. In order to more positively hold the cable, each of the gripping surfaces includes a plurality of teeth in the form of raised segments of spiral threads. Some of the spiral threads on each of said inserts are right handed and some are left handed to help prevent rotating movement of the cable as it is being gripped. The clamp can be used as a dead end clamp or the housing can contain a second pair of jaws, preferably extending in opposite directions, whereby the clamp is capable of gripping a second cable for electrically and mechanically connecting two cables together.

6 Claims, 4 Drawing Sheets

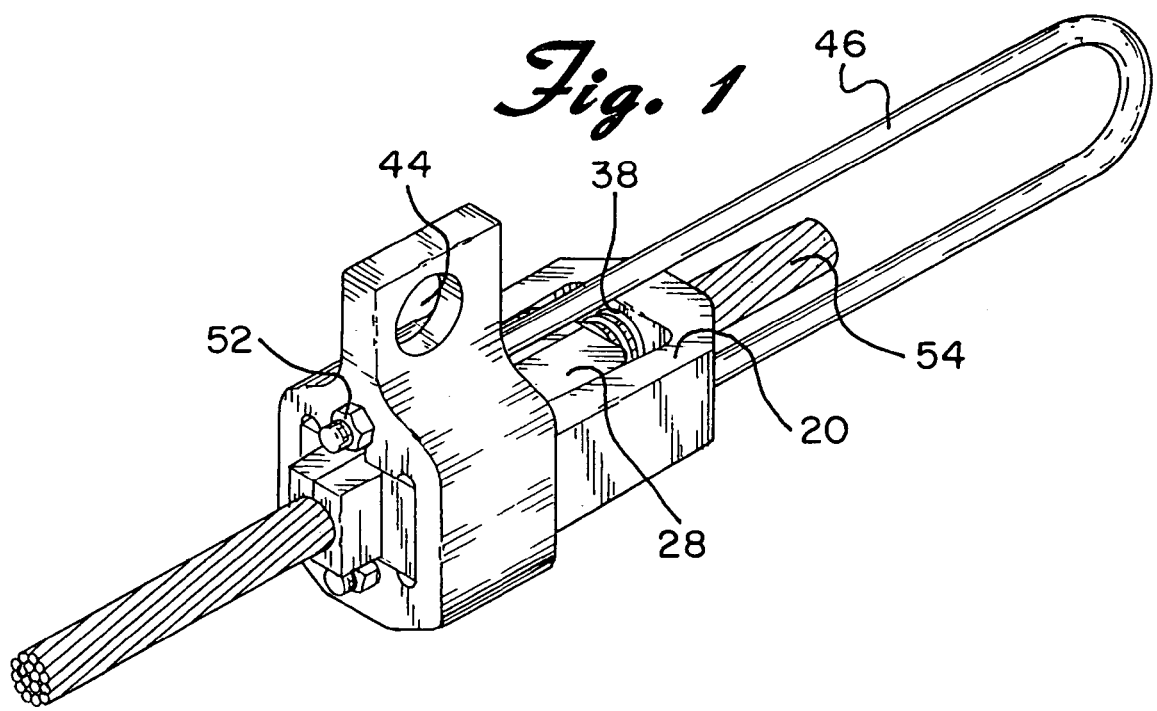
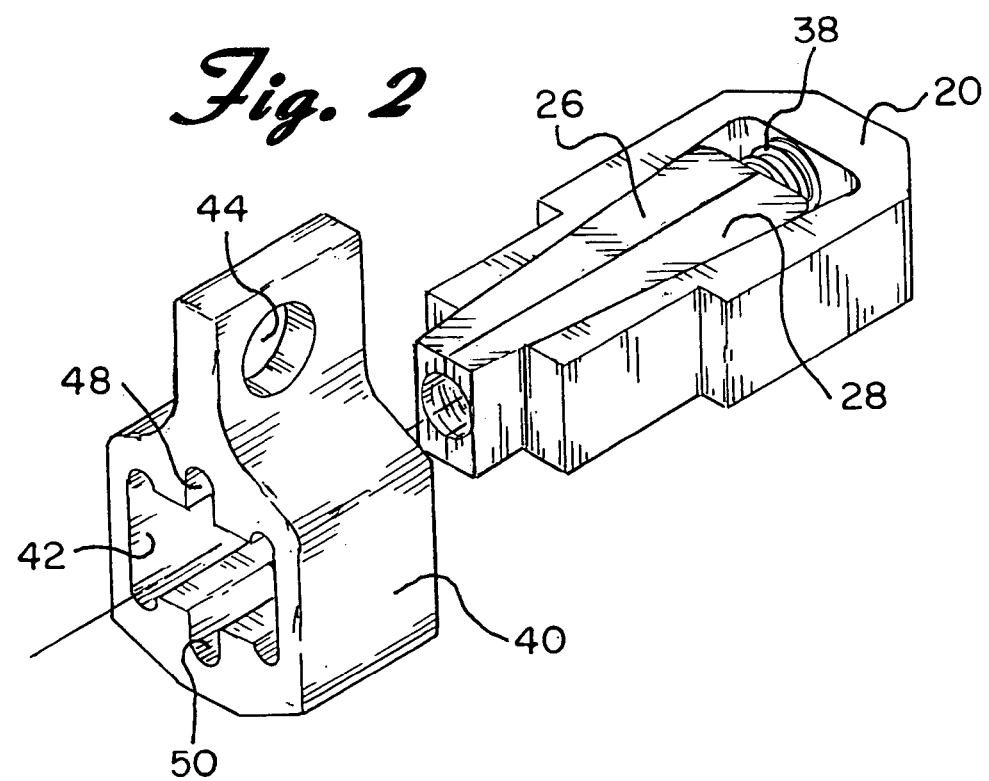

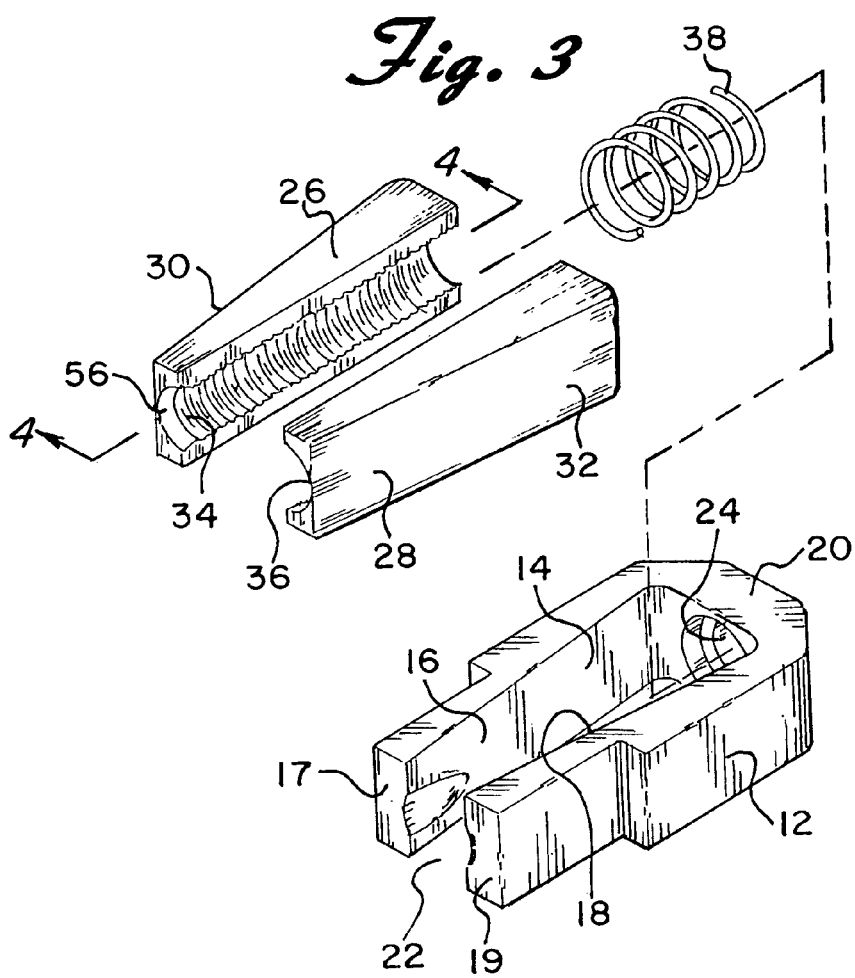
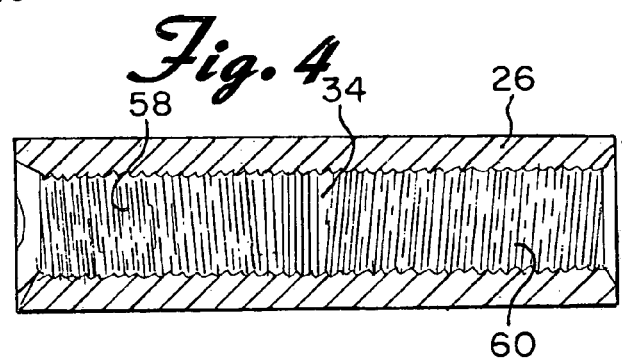
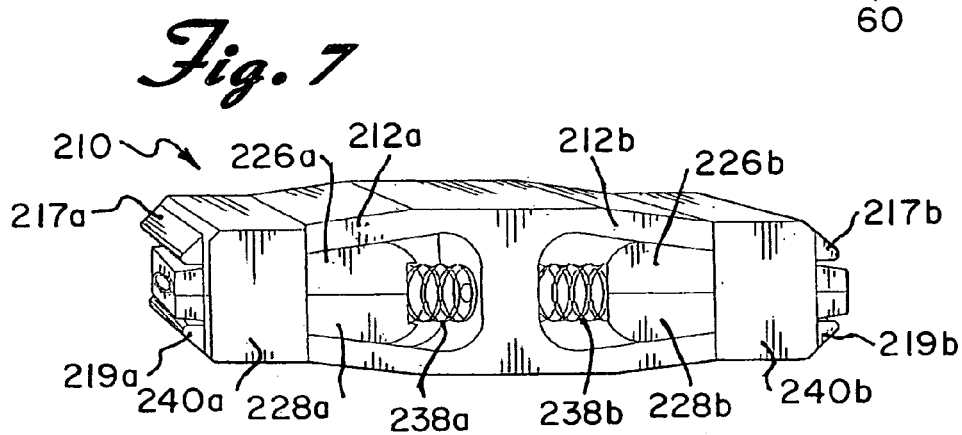

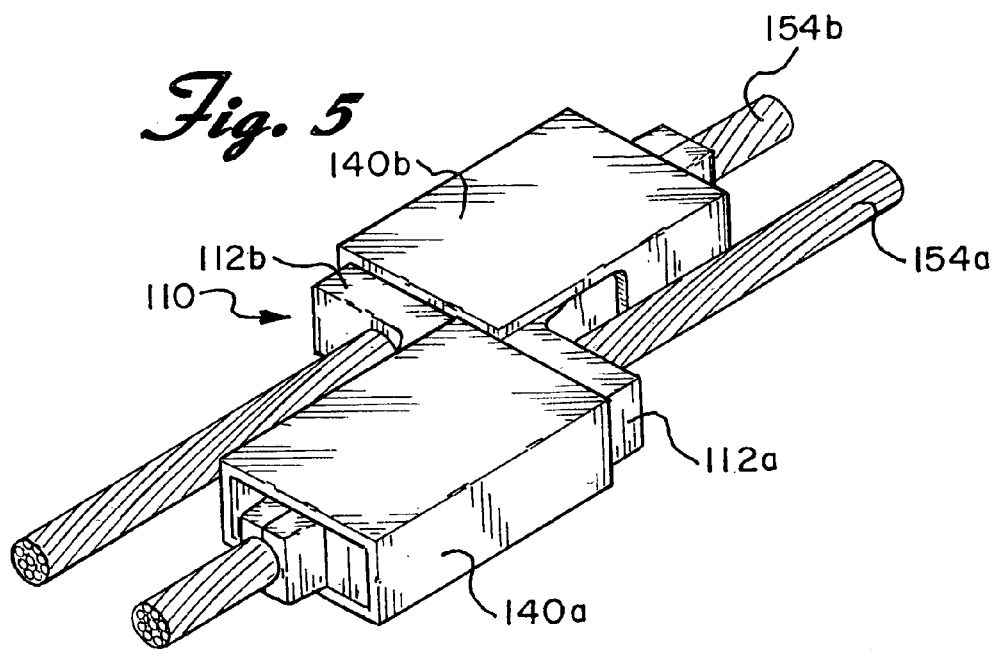
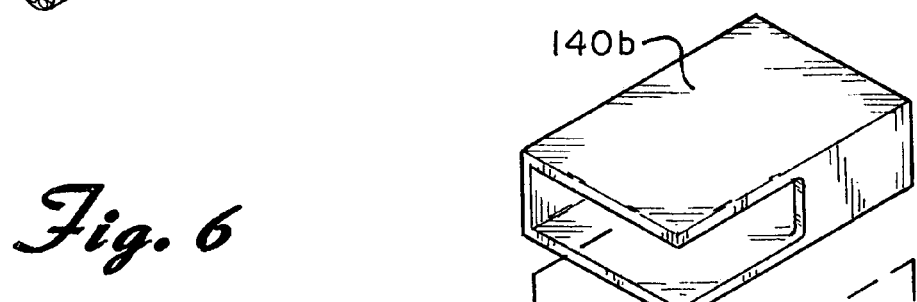
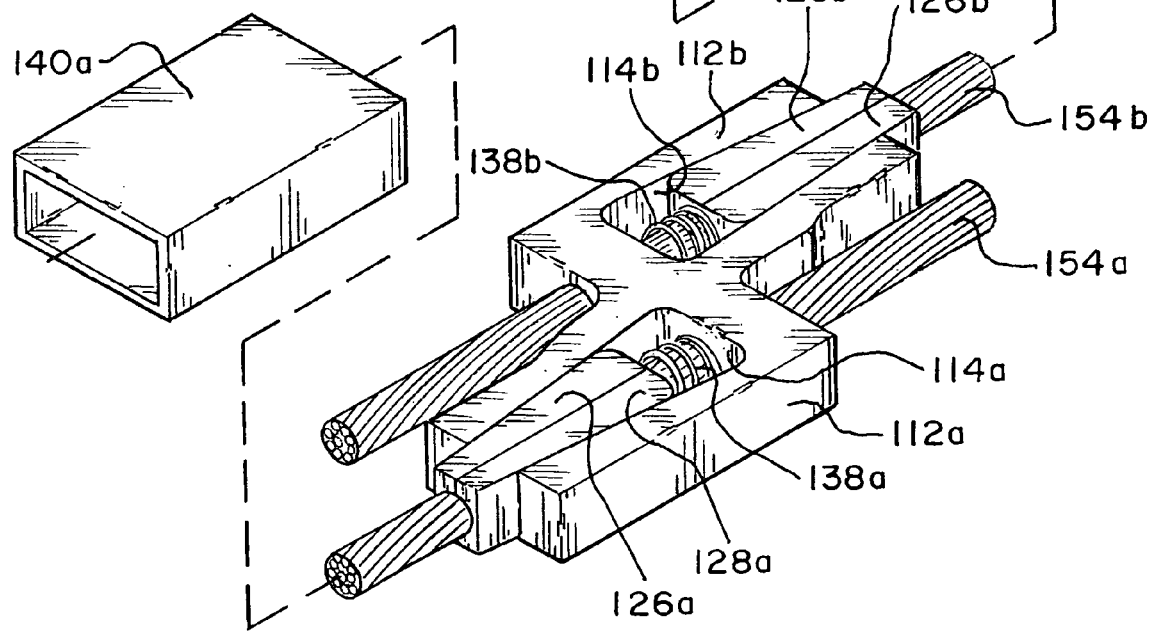

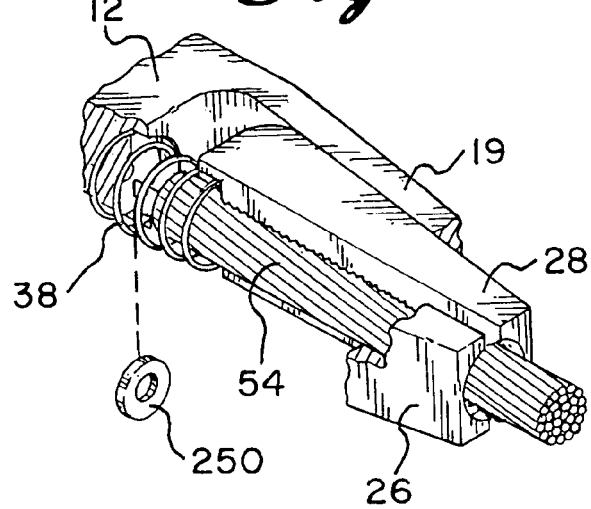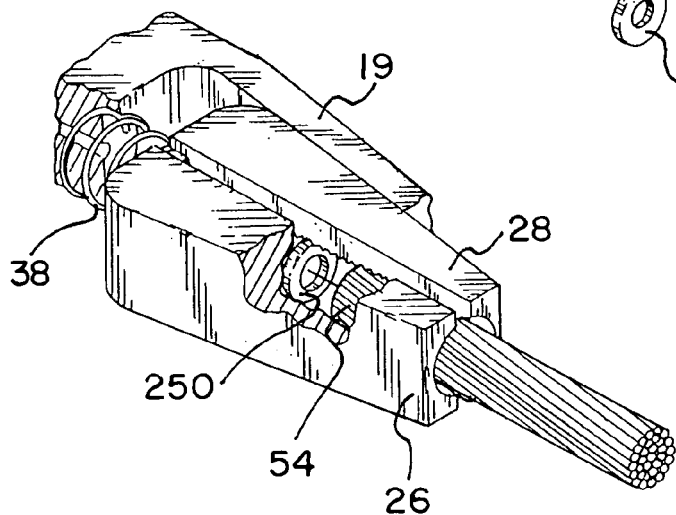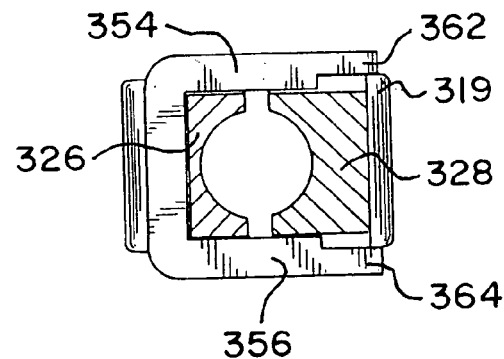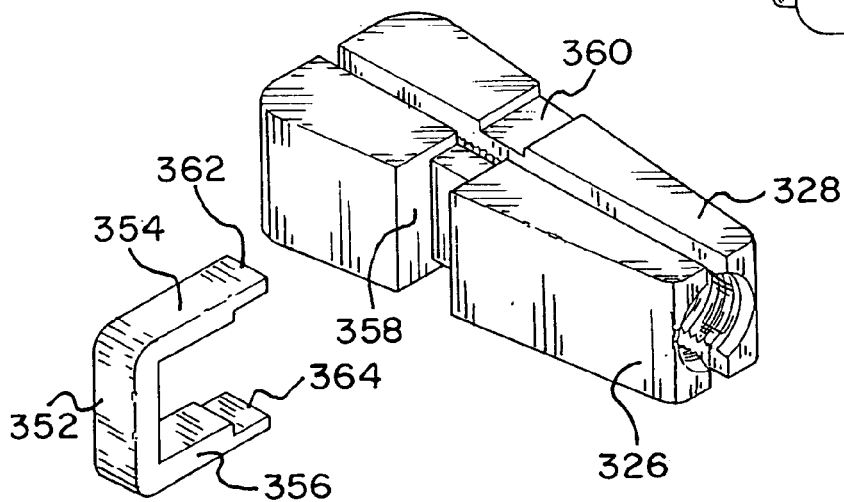

CABLE CONNECTOR

BACKGROUND OF THE INVENTION

The present invention is directed toward a cable connector and more particularly toward a connector which is capable of quickly and securely connecting to a high voltage overhead cable. The connector has uses as a dead end connector, as a take off connector or as splice between two cables.

In dealing with overhead cables and electrical power transmission lines it is frequently desirable to have the ends anchored to a supporting structure. For this purpose, couplings or connectors referred to as "dead end" are often used. One example of a dead end connector can be found in U.S. Pat. No. 4,183,686 to De France. While the De France device may work well, it includes a plurality of nuts and bolts that must be manually turned in order to clamp the connector onto the cable. This is labor intensive and slow.

Arrangements have been proposed in the past to include a pair of opposing wedges within a housing to clamp the cable. Such arrangements are described in published International Application No. WO 02/073765 to Tolkko. According to Tolkko, the problem with prior anchor clamps of this type is that the cable slips between the wedges in the direction of pulling, especially before the wedges have moved sufficiently to the final gripping position. Tolkko attempts to solve the problem by adding a stay tightener to the system. The stay tightener is clamped onto the cable just behind the wedges. In this way, should the cable begin to slip in the wedges, the stay tightener pushes on the wedges forcing them to more tightly clamp onto the cable.

While the Tolkko clamp may be an improvement of similar prior devices, it still suffers from a number of deficiencies. As with the De France dead end connector, the stay tightener must be bolted onto the cable after it is inserted into the clamp which increases the time and effort needed to utilize the clamp. Because the stay tightener must be manually attached, a workman must be within arms length of the clamp when it is being attached and cannot connect the same from a remote location. In addition, the use of the stay tightener essentially prevents the Tolkko device from being modified to be used as a cable splice.

SUMMARY OF THE INVENTION

The present invention is designed to overcome the deficiencies of the prior art discussed above. It is an object of this invention to provide a dead end connector that utilizes wedges and which is simple in construction and easy to install on a cable.

It is another object of the invention to provide a dead end connector that securely grips a cable with wedges without allowing the same to slip.

It is a further object of the invention to provide a dead end connector that can be attached from a remote location.

It is an even further object of the invention to provide a connector that utilizes two pair of wedges that can be used to splice two cables together.

In accordance with the illustrative embodiments, demonstrating features and advantages of the present invention, there is provided a cable clamp which includes a housing having a cavity therein with two opposed walls and an open end in communication with the cavity. A pair of wedge shaped jaws are located within the housing and are slideably movable toward and away from the opening. Each of the jaws includes a semi-cylindrical gripping surface which are adapted to move toward each other to grip a cable therebetween when the jaws move toward the opening and are able to move away from each other when the jaws move away from the opening so as to release a cable located therebetween. A spring biases the jaws toward the opening so that they are biased into the gripping position. In order to more positively hold the cable, each of the gripping surfaces includes a plurality of teeth in the form of raised segments of spiral threads. Some of the spiral threads on each of said inserts are right handed and some are left handed to help prevent rotating movement of the cable as it is being gripped. The clamp can be used as a dead end clamp or the housing can contain a second pair of jaws, preferably extending in opposite directions, whereby the clamp is capable of gripping a second cable for electrically and mechanically connecting two cables together.

Other objects, features, and advantages of the invention will be readily apparent from the following detailed description of preferred embodiments thereof, taken in conjunction with the drawings.

BRIEF DESCRIPTION OF THE DRAWINGS

For the purposes of illustrating the invention, there are shown in the accompanying drawings forms which are presently preferred; it being understood that the invention is not intended to be limited to the precise arrangements and instrumentalities shown.

FIG. 1 is a top front perspective view of a first embodiment of the cable clamp being utilized as a dead end connector;

FIG. 2 is a view similar to FIG. 1 but showing the clamp before it is connected to a cable;

FIG. 3 is an exploded view of the clamp of FIG. 2 illustrating the component parts thereof;

FIG. 4 is a sectional view taken along line 4-4 of FIG. 3;

FIG. 5 is a perspective view of a second embodiment of the clamp of the invention;

FIG. 6 is a perspective view of the second embodiment of FIG. 5 but with the covers removed for clarity;

FIG. 7 is a perspective view of a third embodiment of the cable clamp of the invention;

FIG. 8 is a perspective view of a portion of a clamp of the invention with portions broken away and illustrating an additional optional feature thereof;

FIG. 9 is a perspective view similar to FIG. 8 illustrating an aspect of the operation of the clamp shown therein;

FIG. 10 is a perspective view of a further optional feature useful with the clamp of the invention, and;

FIG. 11 is a sectional view taken along line 11-11 of FIG. 10.

DETAILED DESCRIPTION OF THE PREFERRED EMBODIMENTS

Referring now to the drawings in detail wherein like reference numerals have been used throughout the various figures to designate like elements, there is shown in FIGS. 1-4 a cable connector constructed in accordance with the principles of the present invention and designated generally as 10. The cable connector 10 is configured in FIG. 1 to be used as a dead end connector. As will become readily apparent, however, the same principles of construction and operation can be used to produce various types of connectors.

The cable connector 10 essentially includes a substantially U-shaped housing 12 having a cavity 14 therein. The cavity 14 is comprised of two substantially opposed inner walls 16 and 18 on the inside of legs 17 and 19 that extend from the base 20 of the U. The free ends of the legs 17 and 19 are spaced apart to form an open end 22 which is in communication with the cavity 14.

Although the walls 16 and 18 are referred to as opposed walls, they are not parallel to each other. Rather, they taper from a position wherein they are further apart from each other adjacent the base 20 and are closer to each other adjacent the opening 22. An aperture 24 is formed in the base 20 and is in alignment with the opening 22 of the housing 12.

A pair of substantially identical jaws 26 and 28 are configured, as best seen in FIG. 2, so as to fit within the cavity 14 of the housing 12. Each of the jaws 26 and 28 is essentially wedge-shaped having an outer surface such as shown at 30 and 32 and a semi-cylindrically shaped gripping inner surface such as shown at 34 and 36, respectively.

As shown in FIGS. 2 and 3, the semi-cylindrical gripping surfaces 34 and 36 of the jaws 26 and 28 cooperate with each other to form a substantially cylindrically shaped opening throughout the length thereof. The outer surfaces 30 and 32 are adapted to slide on the two opposed side walls 16 and 18 of the housing 12. As should be readily apparent to those skilled in the art, as the jaws 26 and 28 are moved toward the opening 22, the wedge shapes of the jaws and the shape of the walls 16 and 18 cause the gripping surfaces 34 and 36 to move toward each other. On the other hand, as the jaws 26 and 28 move rearwardly away from the opening 22, the gripping surfaces 34 and 36 are capable of moving away from each other. A coil spring 38 biases the jaws 26 and 28 forwardly toward the opening 22 so that the gripping surfaces 34 and 36 tend to be in their closed or gripping position.

The diameter of the biasing spring 38 is greater than the diameter of the aperture 24 in the base 20 of the housing 12. Similarly, the diameter of the coil spring 38 is larger than the opening formed by the gripping surfaces 34 and 36 when they are in their fully open and retracted position. In this way, the spring 38 will not pass through the aperture 24 nor into the interior of the jaws 26 and 28. While not shown, the base 20 may have an additional recess surrounding the aperture 24 and a similar recess may be formed at the ends of the jaws 26 and 28 into which the ends of the spring 38 may rest. These recesses would maintain the spring 38 in axial alignment with the center of the jaws and the center of the aperture 24.

The clamp 10 can be assembled by simply inserting the jaws 26 and 28 into the cavity 14 from the open top or bottom as viewed in FIGS. 2 and 3. The biasing spring 38 can then be inserted into its proper position. To prevent the jaws 26 and 28 from falling out and to insure that they can move only forward and rearwardly toward and away from the opening 22, a keeper in the form of a yoke 40 is positioned over the free ends of the legs 17 and 19 of the housing 12. The inside opening 42 of the yoke 40 is dimensioned so as to fit around the end of the housing 12 with the jaws 26 and 28 positioned therein. In the preferred embodiment shown in FIGS. 1 and 2, the yoke 40 includes a come along eye 44 which can be used to allow a workman to grab onto the clamp and remotely operate or control the positioning of the same.

To be used as a dead end connector the cable connector 10 also includes a bale 46 in the form of a U-shaped bar. The free ends of the bar 46 pass through openings 48 and 50 in the yoke 40 and are maintained in place by bolts 52 or the like threaded onto the ends thereof.

The dead end clamp shown in FIGS. 1-3 is used in the following manner. First, all of the component parts are assembled as described above including the yoke 40 and the bale 46. A cable 54 is then forced into the forward end of the jaws 26 and 28, i.e. the left side as viewed in FIGS. 1, 2 and 3. To help guide the cable 54 into the jaws, the forward ends are preferably chamfered such as shown at 56. As the cable 54 is moved into the jaws, the jaws tend to move rearwardly against the force of the spring 38 and the gripping surfaces 34 and 36 move away from each other in order to allow the cable 54 to pass therethrough.

In the preferred embodiment of the invention, the aperture 24 is large enough for the cable 54 to pass therethrough so that a workman can determine, even from a distance, that the cable has been fully inserted into the clamp. When the cable is in its proper position, the cable 54 and/or the bale 46 can be pulled in directions opposite each other. As the cable 54 tries to pull out of the jaws 26 and 28, the gripping surfaces 34 and 36 move closer to each other as a result of the spring 38 and the pulling of the cable 54 so as to grip the cable even more tightly. Since substantially all of the parts of the connector 10 are made of aluminum, the clamp provides both an electrical and mechanical connection to the cable 54.

As is well known in the art, cables such as shown at 54 are normally comprised of a number of helically wound aluminum and/or steel wires or strands. Because the strands are helically wound, cables can sometimes slip through a clamping mechanism by twisting as a pulling force is applied.

To prevent the foregoing, the gripping surfaces 34 and 36 are formed by a plurality of teeth in the form of raised segments of spiral threads. These threads are shown most clearly in FIGS. 3 and 4. It has also been found to be beneficial to form some of the threads such as shown at 58 on the left side of FIG. 4 to have essentially a right hand or clockwise turn while some of the threads such as shown at 60 have a left hand or counterclockwise turn. The spiral threads such as shown at 58 and 60 can either be formed directly into the gripping surfaces 34 and 36 of the jaws 26 and 28 or can be steel inserts that are attached to the gripping surfaces. Examples of such inserts can be found in U.S. Pat. No. 6,023,549, the entire subject matter of which is incorporated herein by reference.

A second embodiment 110 of the invention is shown in FIGS. 5 and 6. The cable connector 110 can be used as a splice for connecting two cables 154*a* and 154*b* together.

The cable connector 110 essentially includes a pair of substantially U-shaped housings 112*a* and 112*b* arranged side by side, offset from each other and extending in opposite directions. Each of the housings 112*a* and 112*b* includes a cavity 114*a* and 114*b*, respectively. Also, located within each cavity, are pairs of jaws 126*a*, 128*a* and 126*b*, 128*b*, respectively. As with the first embodiment of the invention, the jaws are biased into their forward or gripping position by spiral biasing springs 138*a* and 138*b*.

In order to prevent the jaws 126*a*, 128*a* and 126*b*, 128*b* from falling out of the cavities 114*a* and 114*b*, covers 140*a* and 140*b* are provided. The covers 140*a* and 140*b* are essentially rectangularly shaped tubular members with open ends that frictionally fit over the major portions of the housings 112*a* and 112*b* as shown most clearly in FIG. 5. The covers 140*a* and 140*b* would normally be assembled onto the housings 112*a* and 112*b* before the cables 154*a* and 154*b* are inserted into the jaws.

Cable clamp 210 shown in FIG. 7 illustrates a third embodiment of the invention. Cable clamp 210 is similar in some ways to cable clamp 110 shown in FIGS. 5 and 6 in that there are two housings 212*a* and 212*b* but rather than being offset, they are arranged so as to be in axial alignment.

Each of the housings 212a and 212b have pairs of jaws 226a, 228a and 226b, 228b therein along with biasing springs 238a and 238b. In addition, covers or yokes 240a and 240b are arranged around the free ends of the legs 217a, 219a and 217b, 219b in order to maintain the jaws in their proper position. The cable clamp shown in FIG. 7 has as its primary use to connect two cable ends together by inserting one cable end into the space between the jaws 226a and 228a from the left as viewed in FIG. 7 and a second cable end into the jaws 226b and 228b from the right as viewed in FIG. 7. The cables are then gripped in essentially the same manner as described with reference to the first embodiment above.

When using any of the embodiments of the inventive clamp described, it sometimes occurs that it is difficult to force the end of the cable 54 into the ends of the jaws 26 and 28. Depending on the size of the cable and of the clamp, the cable may simply force the jaws backward but may not enter the space between the jaws. To prevent this from happening, the jaws can be preset in a partially open position. This is accomplished by manually moving the jaws rearwardly, allowing them to spread apart and inserting a washer 250 or the like in between the jaws as shown in FIG. 8. The washer 250 will function to maintain the jaws in an open position.

With the washer 250 in place, the ends of the jaws 26 and 28 are open and it is easier to insert a cable end therein. As the cable end moves axially into the jaws, it engages the washer 250. The washer is then simply displaced and eventually simply falls out and is discarded as shown in FIG. 9.

There may also be occasions when the end of the cable 54 engages and pushes only one of the jaws or rearwardly and the other of the jaws may tend to remain in its original position. To prevent this from happening, the jaws may be linked together through the use of a yoke such as shown at 352 in FIGS. 10 and 11. The legs 354 and 356 of the yoke 352 loosely fit around the grooves 358 and 360 formed on the outer surface of the jaws 326 and 328. As should be readily apparent, the yoke 352 forces the jaws 326 and 328 to move in unison forwardly and backwardly. As can also be seen in FIGS. 10 and 11, the free ends 362 and 364 of the legs 354 and 356 are reduced in thickness so as to ride on the top and bottom of the leg 319 of the U-shaped clamp housing.

The present invention may be embodied in other specific forms without departing from the spirit or essential attributes thereof and accordingly, reference should be made to the appended claims rather than to the foregoing specification as indicating the scope of the invention.

I claim:

1. A cable clamp for electrically and mechanically connecting two cables together comprising:

a housing comprised of first and second U-shaped members, each member comprised of two opposed walls but being substantially open on two sides thereof, a first cavity having a first opening in communication therewith located in said first member and a second cavity having a second opening in communication therewith located in said second member, said first and second openings being in substantial axial alignment with each other but facing in opposite directions, each of said cavities being visible from both sides of said housing so that cables passing through said openings are visible from outside said housing;

first and second yokes, said first yoke surrounding said two opposed walls of said first U-shaped member adjacent said first opening and said second yoke surrounding said two opposed walls of said second U-shaped member adjacent said second opening;

first and second pairs of jaws located within said housing, said first pair of jaws being movable toward and away from said first opening and said second pair of jaws being movable toward and away from said second opening, each of said jaws including a wedge-shaped outer surface and a semi-cylindrical gripping surface, said gripping surfaces of each pair of jaws being adapted to move toward each other to grip a cable therebetween when said jaws move toward their respective opening and are able to move away from each other when said jaws move away from their respective opening so as to release a cable located therebetween, and biasing means biasing said jaws toward said openings.

2. The cable clamp as claimed in claim 1 wherein said biasing means are comprised of coil springs.

3. The cable clamp as claimed in claim 1 wherein each of said gripping surfaces includes a plurality of teeth for gripping said cable.

4. The cable clamp as claimed in claim 3 wherein said teeth are in the form of raised segments of spiral threads.

5. The cable clamp as claimed in claim 4 wherein some of the spiral threads are right handed and some are left handed.

6. The cable clamp as claimed in claim 1 further including means for temporarily maintaining each of said pairs of jaws away from each other prior to the insertion of a cable therein in order to assist in the insertion of said cable.

* * * * *